United States Patent Office 2,802,727
Patented Aug. 13, 1957

2,802,727

ARYLOXYALKYL CARBALKOXYALKYL SULFITE DIESTERS

Walter D. Harris, Naugatuck, Albert W. Feldman, North Haven, and John W. Zukel, Hamden, Conn., assignors to United States Rubber Company, New York, N. Y., a corporation of New Jersey No Drawing. Application September 3, 1954, Serial No. 454,226

14 Claims. (Cl. 71—2.3)

This invention relates to improvements in new chemicals, insecticides and herbicides.

The new chemicals of the present invention are aryloxyalkyl carbalkoxyalkyl sulfite diesters and haloaryloxyalkyl carbalkoxyalkyl sulfite diesters in which the aryl group is a hydrocarbon radical of the benzene or naphthalene series, the alkyl group attached to the aryloxy group has 2 or 3 carbon atoms, the alkoxy group has 1 to 15 carbon atoms, and the other alkyl group of the carbalkoxyalkyl radical has 1 or 2 carbon atoms. The chemicals of the present invention may be represented by the formula

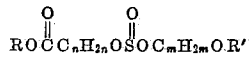

in which R is an alkyl radical having 1 to 15 carbon atoms, $n$ is 1 or 2, $m$ is 2 or 3 and different carbon atoms of the $C_mH_{2m}$ radical are connected to the aryloxy oxygen and to the sulfite oxygen, and R' is an aryl or haloaryl radical of the benzene or naphthalene series. These compounds are useful as insecticides, particularly for control of mites. The chloroaryloxyalkyl carbalkoxyalkyl sulfites in which the aryl group is a hydrocarbon radical of the benzene series are effective plant growth regulants and are particularly useful as pre-emergence herbicides.

The preparation of the chemicals of the invention may be carried out by reacting the selected aryloxyalkanol with thionyl chloride to form the chlorosulfinate and then reacting the chlorosulfinate with the selected carbalkoxyalkanol, i. e. the selected alkyl glycolate or alkyl lactate (alkyl alpha-hydroxy-propionate) or alkyl beta-hydroxypropionate. Preferably, as illustrated in the preparation below, the selected carbalkoxyalkanol is reacted with thionyl chloride and the resulting chlorosulfinate is reacted with the selected aryloxy-alkanol. The aryloxyalkanols or glycol mono-aryl ethers, may readily be prepared by reacting the selected phenol with the selected alkylene chlorhydrin or alkylene oxide, e. g. ethylene chlorhydrin, trimethylene chlorhydrin, ethylene oxide, propylene oxide. This is a well known reaction. The preparation of alkyl glycolates is known. (U. S. Patents 2,211,625 and 2,211,693.) Alkyl hydroxy-propionates are readily prepared from the hydroxy-propionic acid and the appropriate alcohol.

The following reactions illustrate the preparation of carbomethoxymethyl 2-phenoxyethyl sulfite:

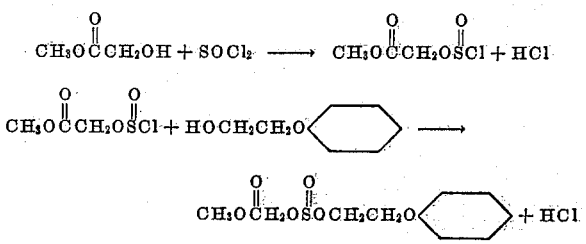

The chlorosulfinates obtained in the first reaction are sufficiently stable that they can be distilled under reduced pressure and stored for a short period with only slight decomposition. The second step is conveniently carried out in the presence of a proton acceptor such as pyridine, dimethylamine, or trimethylamine to sequester hydrogen chloride, in a solvent such as benzene, xylene or solvent naphtha. A wide variation in temperatures is possible but temperatures below 30° C. are most convenient.

Examples of the sulfite diesters of the present invention are:

Carbomethoxymethyl 2-phenoxyethyl sulfite.
Carbomethoxymethyl 2-phenoxyisopropyl sulfite.
Carbethoxymethyl 3-phenoxypropyl sulfite.
1-carbethoxyethyl 2-phenoxyethyl sulfite.
2-carbethoxyethyl 2-phenoxyisopropyl sulfite.
Carbethoxymethyl 2-(alpha-naphthoxy)ethyl sulfite.
Carbethoxymethyl 2-(beta-napthoxy)isopropyl sulfite.
Carbomethoxymethyl 2 - (o - chlorophenoxy)isopropyl sulfite.
Carbethoxymethyl 3-(m-chlorophenoxy)propyl sulfite.
Carbethoxymethyl 2-(p-chlorophenoxy)ethyl sulfite.
Carbethoxymethyl 2-(2,4-dichlorophenoxy)ethyl sulfite.
Carbethoxymethyl 2-(3,4-dichlorophenoxy)ethyl sulfite.
Carbethoxymethyl 2-(2,4,5-trichlorophenoxy)ethyl sulfite.
Carbobutoxymethyl 2-(pentachlorophenoxy)ethyl sulfite.
Carbomethoxymethyl 2-(p-bromophenoxy)ethyl sulfite.
Carbopropoxymethyl 2-(p-fluorophenoxy)ethyl sulfite.
Carbethoxymethyl 2-(o-toloxy)ethyl sulfite.
Carbethoxymethyl 2-(m-toloxy)isopropyl sulfite.
Carbethoxymethyl 3-(p-toloxy)propyl sulfite.
1 - carbobutoxyethyl 2 - (2-methyl-4-chlorophenoxy)ethyl sulfite.
2 - carbamyloxyethyl 2' - (o-isopropylphenoxy)isopropyl sulfite.
1-carbohexoxyethyl 2-(p-tert.-butylphenoxy)isopropyl sulfite.
1-carbododecoxyethyl 2-(2,4-dichlorophenoxy)ethyl sulfite.
1-carbopentadecoxyethyl 2-(2,4-dichlorophenoxy) ethyl sulfite.
1 - carbomethoxyethyl 2 - (2,4-dichlorophenoxy)ethyl sulfite.
1-carbomethoxyethyl 2-(p-tert.-octylphenoxy)ethyl sulfite.
2-carbethoxyethyl 2-(dodecylphenoxy)isopropyl sulfite.
Carbomethoxymethyl 2 - (2,4-dichlorophenoxy)ethyl sulfite.
1-carbethoxyethyl 2-(2,4-dichlorophenoxy)ethyl sulfite.
Carbisopropoxymethyl 2-(2,4-dichlorophenoxy)ethyl sulfite.
Carbobutoxymethyl 2-(dichlorophenoxy)ethyl sulfite.
1-carbohexoxyethyl 2-(dichlorophenoxy)ethyl sulfite.
Carbodecoxymethyl 2-(dichlorophenoxy)ethyl sulfite.
2-carbododecoxyethyl 2-(2,4-dichlorophenoxy) ethyl sulfite.
Carbopentadecoxymethyl 2-(2,4-dichlorophenoxy) ethyl sulfite.
2-carbethoxyethyl 2-(2,4-dichlorophenoxy)ethyl sulfite.
Carbethoxymethyl 2 - (2,4 - dichlorophenoxy) isopropyl sulfite.

The following illustrates the preparation of the intermediate carbalkoxyalkyl chlorosulfinates:

The preparation of carbethoxymethyl chlorosulfinate is conveniently carried out as follows:

Thionyl chloride (154 g., 1.3 mol.) was cooled to 0° C. in a 500 ml. three-necked flask equipped with a stirrer, a thermometer, a hydrogen chloride trap, an addition funnel, and a salt-ice bath. Ethyl glycolate (104 g., 1.0 mol.) was added dropwise with good agitation at −4° C. to +4° C. over a period of 45 minutes. The reaction mixture was stirred ½ hour and allowed to stand overnight (18 hours) at 0° C. protected by a calcium chloride drying tube. Hydrogen chloride and excess thionyl were removed under vacuum (water aspirator) and the residue was distilled. The product, a water white liquid was collected at vapor temperature 75–80° C./3 mm. Specific gravity at 20° C.–1.3553.

1-(carbobutoxy)ethyl chlorosulfinate is readily prepared from butyl lactate and thionyl chloride

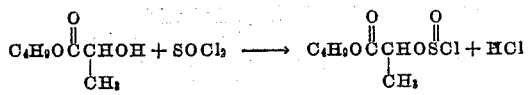

by the procedure described above, using the same molar ratios (1:1.3). The reaction was highly exothermic. The product was collected as a water white liquid boiling at 79° C./0.9 mm. Yield 76% (174.3 g.). Refractive index $[n]_D^{20}$ 1.4588.

Other glycolates react in a similar manner except that those with long chain alkyl radicals are so high boiling that it is difficult to distill them because of the tendency toward decomposition at high temperatures. A certain amount of the bis-carbalkoxy-methyl ester is always formed so that undistilled chlorosulfinates contain some of the bis-sulfite as an impurity.

The following illustrates the preparation of a chemical of the present invention:

PREPARATION OF CARBETHOXYMETHYL 2-PHENOXYETHYL SULFITE.

A solution of 2-phenoxyethanol (27.6 g., 0.20 mol.) pyridine (18.2 g., 0.23 mol.) and a solvent naphtha (50 ml.) was stirred in an ice-water bath while carbethoxymethyl chlorosulfinate prepared as above (42.9 g., 0.23 mol.) was added dropwise. The temperature during the addition rose to a maximum of 18° C. The reaction mixture was stirred an additional 15 minutes, washed successively with 50 ml. water, 50 ml. saturated aqueous sodium chloride, then with enough 2-normal sodium hydroxide to keep the pH of the aqueous layer above 12 for at least five minutes. Further washing with saturated aqueous sodium chloride reduced the pH to 7. The product was then concentrated under the reduced pressure to a pot temperature 130° C./0.4 mm. and filtered through a filter aid (Dicalite). The residue was a very pale yellow liquid. Yield 55 g. (95.6%).

The physical properties of carbethoxymethyl 2-phenoxyethyl sulfite and of other representative compounds made by the above procedure are shown below:

Carbethoxymethyl 2-phenoxyethyl sulfite. Refractive index $[n]_D^{20}$ 1.5036. Sp. gr. at 20° C. 1.2452. Analysis: theory 11.10% S; found 11.02% S.

Carbethoxymethyl 2-(p-tert.-butylphenoxy)ethyl sulfite. Refractive index $[n]_D^{20}$ 1.5000 Sp. gr. at 20° C. 1.2452. Analysis: theory 10.67% S; found 10.56% S.

Carbethoxymethyl 2-phenoxyisopropyl sulfite. Refractive index $[n]_D^{20}$ 1.5010. Sp. gr. at 20° C. 1.2146. Analysis: theory 10.60% S; found 10.58% S.

Carbethoxymethyl 2-(p-tert.-butylphenoxy)isopropyl sulfite. Refractive index $[n]_D^{20}$ 1.4970. Sp. gr. at 20° C. 1.1264. Analysis: theory 9.00% S; found 8.63% S.

Carbethoxymethyl 2-(2-naphthoxy)isopropyl sulfite. Refractive index $[n]_D^{20}$ 1.5532. Sp. gr. at 20° C. 1.2366. Analysis: theory 9.09% S; found 9.21% S.

1-(carbobutoxy)ethyl 2-(p-tert.-butylphenoxy)isopropyl sulfite. Refractive index $[n]_D^{20}$ 1.4842. Analysis: theory 7.78% S; found 8.18% S.

Carbomethoxymethyl 2-(2,4-dichlorophenoxy)ethyl sulfite. Refractive index $[n]_D^{20}$ 1.3371. Analysis: theory 20.7% Cl; found 20.5% Cl.

Carbethoxymethyl 2-(2,4-dichlorophenoxy)ethyl sulfite. Refractive index $[n]_D^{20}$ 1.5295. Sp. gr. at 20° C. 1.3875. Analysis: theory 20.0% Cl; found 19.9% Cl.

Carbododecoxyethyl 2-(2,4-dichlorophenoxy)ethyl sulfite. Refractive index $[n]_D^{20}$ 1.4971. Analysis: theory 14.2% Cl; found 13.2% Cl.

Carbethoxymethyl 2-(4-chlorophenoxy)ethyl sulfite. Refractive index $[n]_D^{20}$ 1.5179. Analysis: theory 10.93% Cl; found 11.04% Cl.

Carbethoxymethyl 2-(2,4,5-trichlorophenoxy)ethyl sulfite. Refractive index $[n]_D^{20}$ 1.5390. Analysis: theory 27.2% Cl; found 26.8% Cl.

1-(carbobutoxy)ethyl 2-(4-chlorophenoxy)ethyl sulfite. Refractive index $[n]_D^{20}$ 1.5020. Analysis: theory 9.73% Cl; found 9.17% Cl.

1-(carbobutoxy)ethyl 2-(2,4-dichlorophenoxy)ethyl sulfite. Refractive index $[n]_D^{20}$ 1.5095. Analysis: theory 17.17% Cl; found 16.24% C.

Carboethoxymethyl 2-(2,4-dichlorophenoxy)isopropyl sulfite. Refractive index $[n]_D^{20}$ 1.5213. Sp. gr. at 20° C. 1.3478. Analysis: theory 19.14% Cl; found 18.95% Cl.

The chemicals of the invention are useful as insecticides, particularly for the control of mites. The carbalkoxyalkyl chloroaryloxyalkyl sulfites in which the aryl group is a hydrocarbon radical of the benzene series are effective plant growth regulants and are particularly useful as pre-emergence herbicides. In their application as agricultural chemical formulations for insecticidal, growth regulant and herbicidal uses, the chemicals may be applied as dusts when admixed with a powdered solid carrier, such as various mineral silicates, e. g. mica, talc, pyrophilite and clays. The chemicals may be mixed with surface-active dispersing agents as insecticidal or herbicidal concentrates to facilitate emulsification in water and to improve the wetting properties when used as sprays. If desired, the chemicals may be mixed with a powdered solid carrier, together with a surface-active dispersing agent so that a wettable powder may be obtained which may be applied directly, or which may be shaken up with water for application in that form. The chemicals may be applied by the aerosol method.

The following illustrates the effectiveness of the chemicals of the invention for controlling mites.

In the test on various chemicals of the present invention against two-spotted spider mites (*Tetranychus bimaculatus* Harvey) rings of an adhesive preparation nontoxic to the organisms under test, such as is used on fly papers and for ringing trees, were placed around the borders of the upper surfaces of the leaves of growing pinto bean plants which were at the two-leaf stage. Two-spotted spider mites were transferred to the thus treated leaves by placing infested bean leaves within the border of the adhesive preparation for 24 hours to effect transfer of the mites. The plants thus infested were then sprayed with aqueous emulsions of the various chemicals of the invention at the selected concentrations. The emulsions of the chemicals were prepared by dissolving in 10 parts of the sulfite 1 part of a commercial surface-active dispersing agent comprising the reaction product of castor oil and ethylene oxide and known to be non-toxic at the concentrations used to organisms under test, and then adding enough water to form a 1% emulsion of the sulfite ester. In order to obtain the various concentrations of the sulfite esters, amounts of this 1% emulsion were diluted with enough water to give the proper concentration. Observations were made after 72 hours to determine the kill of the mites. The results were reported as percent mortality of the mites.

The results of the tests with the various sulfite esters of the present invention are shown in the table below:

Table I

| Chemical | Concentration of Chemical | Percent Mortality of Mites |
| --- | --- | --- |
| Carbethoxymethyl 2-phenoxyethyl sulfite | 1:1600 | 59 |
| Carbethoxymethyl 2-(p-tert.-butylphenoxy)-ethyl sulfite | 1:1600 | 95 |
| Carbethoxymethyl 2-phenoxyisopropyl sulfite | 1:1600 | 47 |
| Carbethoxymethyl 2-(p-tert.-butylphenoxy)-isopropyl sulfite | 1:1500 | 100 |
| Carbethoxymethyl 2-(2-naphthoxy)isopropyl sulfite | 1:1600 | 100 |
| 1-(Carbobutoxy)ethyl 2-(p-tert.-butylphenoxy) isopropyl sulfite | 1:1600 | 54 |
| Carbomethoxymethyl 2-(2,4-dichlorophenoxy) ethyl sulfite | 1:1600 | 66 |
| Carbethoxymethyl 2 - (2,4 - dichlorophenoxy) ethyl sulfite | 1:1600 | 80 |
| 1-(Carbododecyloxy)ethyl 2-(2,4-dichlorophenoxy)ethyl sulfite | 1:1600 | 40 |
| Carbethoxymethyl 2-(2,4,5-trichlorophenoxy) ethyl sulfite | 1:5000 | 93 |
| 1-(Carbobutoxy)ethyl 2-(4-chlorophenoxy)ethyl sulfite | 1:1600 | 66 |
| 1-(Carbobutoxy)ethyl 2-(2,4-dichlorophenoxy) ethyl sulfite | 1:1600 | 40 |
| Carboethoxymethyl 2-(2,4-dichlorophenoxy) isopropyl sulfite | 1:1600 | 75 |

The effectiveness of the carbalkoxyalkyl chloroaryloxyalkyl sulfites as pre-emergence herbicides when applied to the soil before emergence of weeds is illustrated in the following:

Mixtures of 40 mg. of each of the various chemicals to be tested and 35 mg. of a non-herbicidal and non-growth regulating surface-active dispersing agent (condensation product of ethylene oxide and an alkylated phenol) were dispersed in 70 cc. of water. The dispersions of the various chemicals were watered on the surface of soil in separate 6-inch clay pots immediately after sowing with a mixture of seeds of both broad leaf and grassy weeds. The application rate of various chemicals was about 20 pounds per acre. Other similar tests were made at reduced application rates of the chemicals. Checks were run with an aqueous solution containing only water and the surface-active agent. The planted seeds included pigweed (*Ameranthus spp.*), foxtail (*Setaria spp.*), crabgrass (*Chenopodium spp.*), ragweed (*Ambrosia spp.*), purslane (*Portulaca olevacea*), quickweed (*Galensoga spp.*), and lamb's quarter (*Chenopodium spp.*). One month after planting, the treatments, were evaluated for percentage weed control of both the broad leaf and grassy weeds on the basis of 0% control for the weed stand of the checks, and 100% control for complete absence of weeds.

The following Table II shows the weed control of various chemicals of the invention at various application rates:

Table II

| Chemical | Percent Weed Control | |
| --- | --- | --- |
| | Broad Leafed | Grasses |
| Carbomethoxymethyl 2-(2,4-dichlorophenoxy) ethyl sulfite: | | |
| Application rate: 8 lbs./acre | 100 | 100 |
| Application rate: 2 lbs./acre | 90 | 90 |
| Carbethoxymethyl 2-(2,4-dichlorophenoxy)ethyl sulfite: | | |
| Application rate: 20 lbs./acre | 100 | 100 |
| Application rate: 5 lbs./acre | 90 | 65 |
| 1-(Carbododecyloxy)ethyl 2-(2,4-dichlorophenoxy)ethyl sulfite: | | |
| Application rate: 8 lbs./acre | 100 | 90 |
| Application rate: 2 lbs./acre | 80 | 90 |
| Carbethoxymethyl 2-(2,4,5-trichlorophenoxy)ethyl sulfite: | | |
| Application rate: 8 lbs./acre | 80 | 50 |
| 1-(Carbobutoxy)ethyl 2-(4-chlorophenoxy)ethyl sulfite: | | |
| Application rate: 20 lbs./acre | 50 | 50 |
| 1-(Carbobutoxy)ethyl 2-(2,4-dichlorophenoxy) ethyl sulfite: | | |
| Application rate: 20 lbs./acre | 100 | 90 |

Table II—Continued

| Chemical | Percent Weed Control | |
| --- | --- | --- |
| | Broad Leafed | Grasses |
| 1-(Carbobutoxy)ethyl 2-(2,4-dichlorophenoxy) ethyl sulfite—Continued | | |
| Application rate: 5 lbs./acre | 100 | 80 |
| Carbethoxymethyl 2-(2,4-dichlorophenoxy)isopropyl sulfite: | | |
| Application rate: 20 lbs./acre | 100 | 50 |

Having thus described our invention what we claim and desire to protect by Letters Patent is:

1. A chemical selected from the group consisting of aryloxyalkyl carbalkoxyalkyl sulfite diesters and haloaryl oxyalkyl carbalkoxyalkyl sulfite diesters having the general structural formula

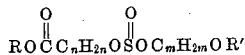

in which R is an alkyl radical having 1 to 15 carbon atoms, R' is selected from the group consisting of aryl radicals and haloaryl radicals of the benzene and naphthalene series, $n$ is 1 to 2, $m$ is 2 to 3 and different carbon atoms of the $C_mH_{2m}$ radical are connected to the aryloxy oxygen and to the sulfite oxygen.

2. A Chloroaryloxyalkyl carbalkoxyalkyl sulfite diester having the general structural formula

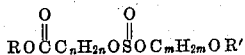

in which R is an alkyl radical having 1 to 15 carbon atoms, R' is a chloroaryl radical of the benzene series, $n$ is 1 to 2, $m$ is 2 to 3 and different carbon atoms of the $C_mH_{2m}$ radical are connected to the aryloxy oxygen and to the sulfite oxygen.

3. Carbomethoxymethyl 2-(2,4-dichlorophenoxy) ethyl sulfite.

4. Carbethoxymethyl 2 - (2,4 - dichlorophenoxy)ethyl sulfite.

5. 1 - (carbododecoxy)ethyl 2 - (2,4 - dichlorophenoxy)ethyl sulfite.

6. 1 - (carbobutoxy)ethyl 2 - (2,4 - dichlorophenoxy) ethyl sulfite.

7. Carbethoxymethyl 2 - (2,4 - dichlorophenoxy)isopropyl sulfite.

8. An agricultural chemical composition comprising a surface-active dispersing agent, and an insecticidal amount of a chemical as defined in claim 1.

9. An agricultural chemical composition comprising a surface-active dispersing agent, and a herbicidal amount of a chloroaryloxyalkyl carbalkoxyalkyl sulfite diester as defined in claim 2.

10. An agricultural chemical composition comprising a surface-active dispersing agent, and a herbicidal amount of carbomethoxymethyl 2-(2,4-dichlorophenoxy)ethyl sulfite.

11. An agricultural chemical composition comprising a surface-active dispersing agent, and a herbicidal amount of carbethoxymethyl 2-(2,4-dichlorophenoxy)ethyl sulfite.

12. An agricultural chemical composition comprising a surface-active dispersing agent and a herbicidal amount of 1-(carbododecoxy)ethyl 2-(2,4-dichlorophenoxy)ethyl sulfite.

13. An agricultural chemical composition comprising a surface-active dispersing agent, and a herbicidal amount of 1-(carbobutoxy) ethyl 2-(2,4-dichlorophenoxy)ethyl sulfite.

14. An agricultural chemical composition comprising a surface-active dispersing agent, and a herbicidal amount of carbethoxymethyl 2-(2,4-dichlorophenoxy)isopropyl sulfite.

References Cited in the file of this patent

UNITED STATES PATENTS

| 2,465,391 | Myles | Mar. 29, 1949 |
| 2,529,494 | Harris et al. | Nov. 14, 1950 |